United States Patent [19]

Farkas

[11] Patent Number: 4,505,037
[45] Date of Patent: Mar. 19, 1985

[54] HACK SAW ATTACHMENT FOR SABRE SAW

[76] Inventor: Eugene L. Farkas, 8092 Jewett, Warren, Mich. 48089

[21] Appl. No.: 422,683

[22] Filed: Sep. 24, 1982

[51] Int. Cl.³ .............................................. B27B 11/02
[52] U.S. Cl. ............................................. 30/122; 30/392
[58] Field of Search ................. 30/392, 393, 394, 500, 30/122, 166

[56] References Cited

U.S. PATENT DOCUMENTS

| | | | |
|---|---|---|---|
| 2,206,614 | 7/1940 | O'Hern | 30/500 X |
| 2,457,829 | 1/1949 | Miller | 30/392 |
| 3,373,779 | 3/1968 | Taft | 30/394 |
| 3,585,719 | 6/1931 | Kivela | 30/166 X |
| 4,294,013 | 10/1981 | Krieg | 30/392 |

Primary Examiner—Jimmy C. Peters
Attorney, Agent, or Firm—Barnes, Kisselle, Raisch, Choate, Whittemore & Hulbert

[57] ABSTRACT

An attachment for a sabre saw which enables the sabre saw to be utilized as a motorized hack saw. The attachment includes an attachment guide adapted to be secured to the guide plate of the sabre saw, a hack saw positioned in the attachment guide for reciprocation with respect thereto and a coupling for securing the hack saw to a reciprocal member of the sabre saw. A handle is secured to the attachment guide to facilitate handling of the hack saw attachment in assembly with a sabre saw. In addition, heat insulating material is place on portions of the attachment guide to reduce friction created external temperatures of the portions of the attachment guide.

12 Claims, 7 Drawing Figures

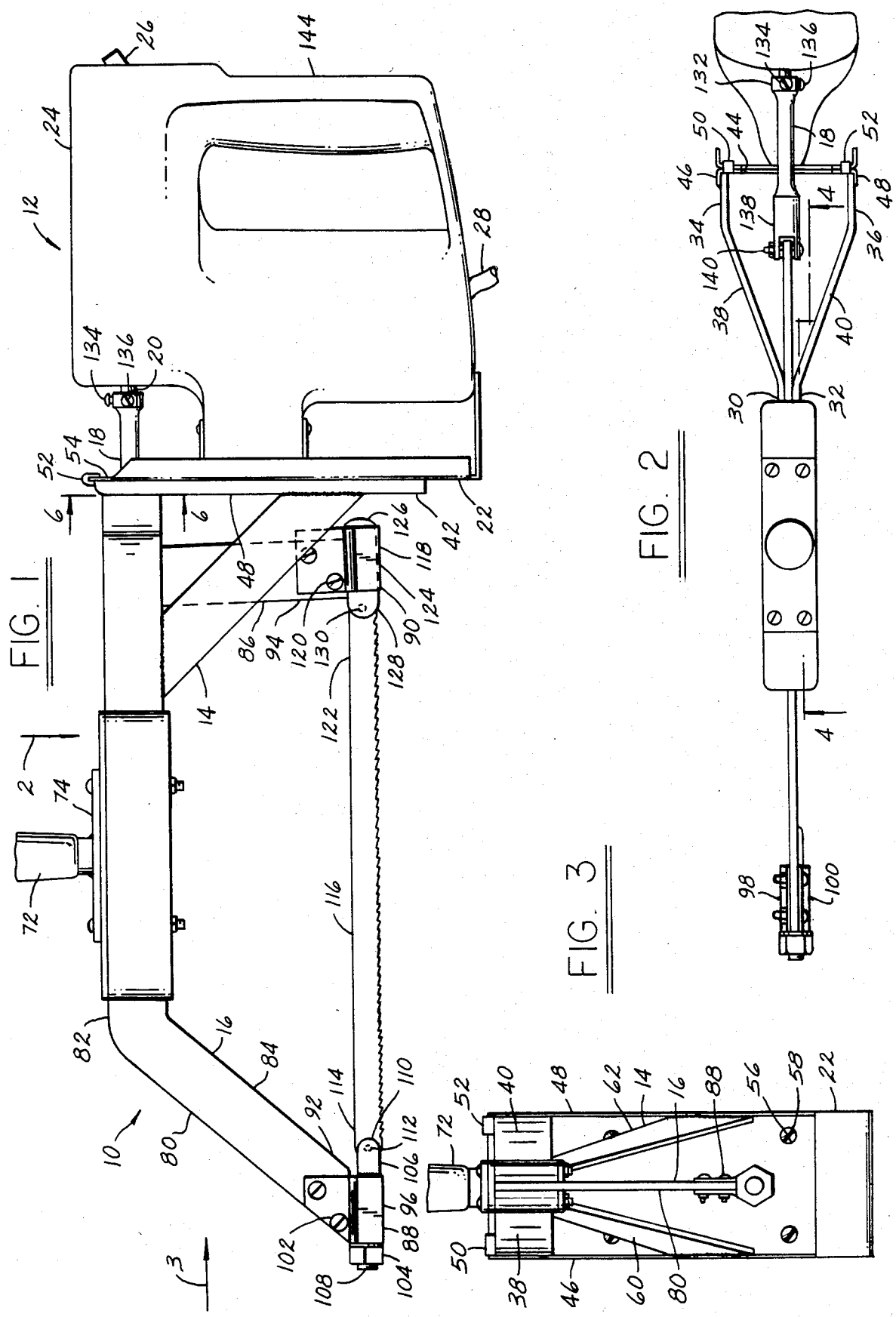

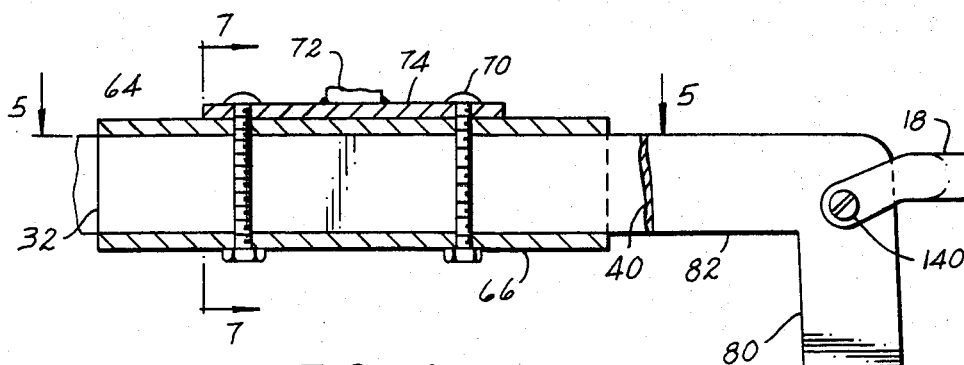
FIG. 4
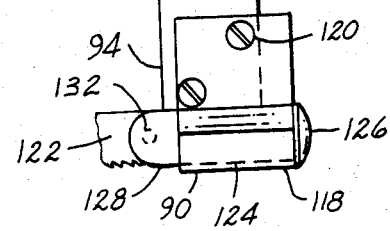
FIG. 5
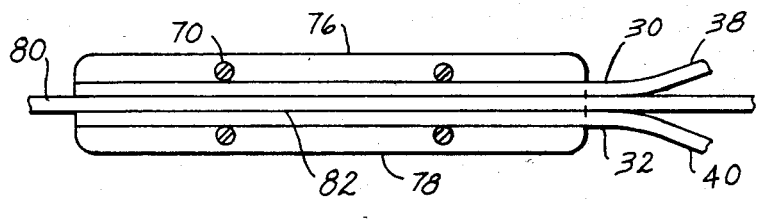
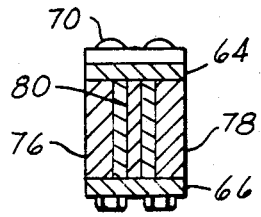
FIG. 7
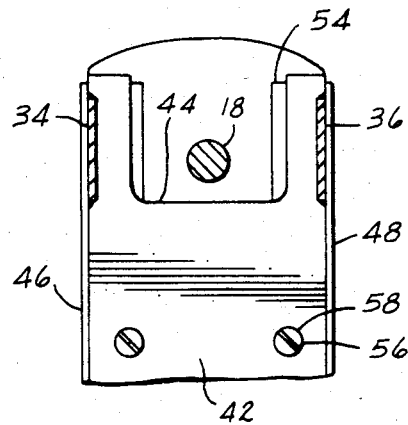
FIG. 6

HACK SAW ATTACHMENT FOR SABRE SAW

BACKGROUND OF THE INVENTION

1. Field of the Invention

The invention relates to sabre saws and refers more specifically to a hack saw attachment for a sabre saw which enables the sabre saw to be utilized as a motorized hack saw.

2. Description of the Prior Art

In the past, hack saws have usually been hand tools, i.e., manually operated devices. The manually operated hack saw has been the standard hack saw in small shops and garages and for home use where the volume of hack saw work has not made it economically feasable to purchase power driven hack saws.

Wherein power driven hack saws have been provided in the past, they have been relatively large machines particularly adapted for continuous repetitive use. Thus, motor driven hack saws of the past have generally been complicated and expensive.

SUMMARY OF THE INVENTION

The invention is a hack saw attachment for a sabre saw whereby the sabre saw may be utilized as a motorized hack saw.

The hack saw attachment of the invention includes attachment guide means adapted to be secured to a sabre saw, hack saw means positioned in the attachment guide means for reciprocating movement with respect thereto and coupling means for securing the hack saw means to a reciprocal member of the sabre saw.

Handle means may be provided on the attachment guide means to facilitate utilizing the hack saw attachment in assembly with the sabre saw. Further, insulating material may be provided on portions of the attachment guide means to reduce the external temperature thereof to a temperature unobjectionable to a user of the hack saw attachment.

BRIEF DESCRIPTION OF THE DRAWINGS

FIG. 1 is a partial elevation view of a hack saw attachment for a sabre saw constructed in accordance with the invention in assembly with a sabre saw.

FIG. 2 is a top view of the hack saw attachment illustrated in FIG. 1 taken in the direction of arrow 2 in FIG. 1.

FIG. 3 is an end view of the hack saw attachment illustrated in FIG. 1 taken in the direction of arrow 3 in FIG. 1.

FIG. 4 is an enlarged partial section view of the hack saw attachment illustrated in FIG. 1 taken substantially on the line 4—4 in FIG. 2.

FIG. 5 is a partial section view of the hack saw attachment illustrated in FIG. 1 taken substantially on the line 5—5 in FIG. 4.

FIG. 6 is an enlarged partial section view of the hack saw attachment illustrated in FIG. 1 taken substantially on the line 6—6 in FIG. 1.

FIG. 7 is an enlarged partial section view of the hack saw attachment illustrated in FIG. 1 taken substantially on the line 7—7 in FIG. 4.

DESCRIPTION OF THE PREFERRED EMBODIMENT

As shown in FIG. 1, the hack saw attachment 10 of the invention is adapted to be secured to a sabre saw 12. With the hack saw attachment attached to the sabre saw 12, the sabre saw 12 may be utilized as a motorized hack saw.

The hack saw attachment 10 includes attachment guide means 14, hack saw means 16 and a coupling member 18 for securing the hack saw attachment 10 to a reciprocal member 20 of the sabre saw 12. The attachment guide means 14 is adapted to be secured to the sabre saw guide 22. The hack saw means 16 is supported in attachment guide means 14 for reciprocating movement and is driven in reciprocating movement through the coupling member 18 and the reciprocal member 20 of the sabre saw 12.

More specifically, the sabre saw 12 includes an outer case 24 shaped as shown and a sabre saw guide plate 22. The sabre saw has an on/off switch 26 and is powered by electricity through a cord 28 which may be connected to a suitable source of electrical energy. In accordance with the usual sabre saw, an electrical motor and mechanical connections are provided within the case 24 such that with the cord 28 connected to a source of electrical energy and the switch 26 in an on position member 20 extending from case 24 is caused to reciprocate whereby the coupling member 18 is caused to reciprocate axially.

Such sabre saws are well known items of commerce and will not therefore be considered in more detail herein. One such sabre saw is shown in U.S. Pat. No. 4,213,242, in conjunction with a guide attachment.

The attachment guide means 14 of the sabre saw attachment 10 includes the two parallel spaced apart hack saw guide members 30 and 32. The ends 34 and 36 of members 30 and 32 are offset by diverging portions 38 and 40 thereof.

The attachment guide means 14 further includes the attaching plate 42. Plate 42 as shown in FIG. 6, includes a notch 44 in the top thereof through which the coupling member 18 extends. Attaching plate 42 also includes the elongated flanges 46 and 48 along the opposite edges thereof as shown best in FIGS. 1 and 2. Also, attaching plate 42 has open return tabs 50 and 52 thereon adapted to fit over the end 54 of the sabre saw guide plate 22 as shown best in FIG. 1. A plurality of openings 56 are provided in the attaching plate 42 in alignment with similar openings in the guide plate 22 of the sabre saw 12 through which nut and bolt assemblies 58 extend to secure the attaching plate 42 to the guide plate 22.

Diagonal braces 60 and 62 are also part of the attachment guide means 14 and are located as best shown in FIGS. 1 and 3. The attaching plate 42, parallel spaced apart guide members 30 and 32 and the diagonal braces 60 and 62 are connected together by appropriate means such as welding at their intersections as shown.

Top and bottom plates 64 and 66 are positioned over the top and bottom of the parallel spaced apart hack saw guide members 30 and 32 as best shown in FIGS. 4 and 7 and are secured in place by bolt and nut assemblies 70 as shown best in FIG. 4. The top and bottom plates 64 and 66 provide a rectangular guide defined by the top and bottom plates 64 and 66 and the parallel spaced apart hack saw guide members 30 and 32 for the hack saw means 16 in which the hack saw means 16 reciprocates.

A handle 72 having a base 74 is also secured to the attachment guide means 14 by means of the bolt and nut assemblies 70 as shown best in FIGS. 1 and 4. The handle 72 facilitates controlling the hack saw attachment 10 and sabre saw 12 in use.

In use, that portion of the parallel spaced apart hack saw guide members 30 and 32 between the top plate 64 and the bottom plate 66 has a tendency to become hot due to the friction created by reciprocation of the hack saw means 16. Accordingly, insulating material 76 and 78 as best shown in FIG. 7 has been provided on the side of each of the spaced apart hack saw guide members 30 and 32 opposite the space therebetween. In particular, fiberglass reinforced autobody filler has been found to be particularly good at reducing exterior surface heat on the hack saw attachment 10 between the upper plate 64 and lower plate 66 when used for the material 76 and 78.

The hack saw means 16 of the hack saw attachment 10 includes the generally U-shaped frame 80 which in cross section is rectangular as shown best in FIG. 7. The frame 80 includes a relatively straight connecting portion 82, the inclined leg portion 84 and vertical leg portion 86 as shown in FIG. 1.

Separate hack saw blade connectors 88 and 90 are provided at the free ends 92 and 94 of the frame 80 as shown best in FIG. 1.

The connector 88 includes a metal band formed to provide a non-circular cylinder 96 and connecting tabs 98 and 100. The tabs 98 and 100 are secured to the end 92 of the leg portion 84 of the frame 80 by convenient means such as the nut and bolt assemblies 102. A non-circular shaft 106 having a threaded end 108 for receiving tightening nut 104 extends through the non-circular cylinder 96. Shaft 106 is provided with the extension 110 thereon having a stud 112 extending, perpendicularly and slightly toward the threaded end thereof, therefrom for receiving one end 114 of the hack saw blade 116.

The hack saw blade connector 90 again includes a metal band having a non-circular cylindrical portion 118 and connecting tabs thereon which are secured to the end 94 of leg 86 of frame 80 by convenient means such as nut and bolt assemblies 120. The shaft 124 having the non-circular portion extending through the non-circular cylinder 118 has a headed end 126 and an extension 128 at the other end thereof. Again, a stud 130 extends perpendicularly to the extension 128 on shaft 124 and slightly towards the headed end thereof to which the other end 122 of the hack saw blade 116 is secured.

As shown best in FIGS. 2 and 4, the coupling member 18 includes an axially extending opening in the end 132 thereof for receiving the reciprocal member 20 of the sabre saw 24. Set screws 134 and 136 assure the rigid connection of the coupling member 18 and reciprocal member 20. The other end 138 of the coupling member 18 is biforcated and thus, fits around the frame 80 of the hack saw means 16. The end 138 of the coupling member 18 is secured to the frame 80 by means of the nut and bolt assembly 140 extending through appropriate openings in the biforcated end 138 of the coupling 18 and the hack saw frame 80.

Thus, with a hack saw blade 116 secured in the hack saw means 14 by placing openings in the ends of the hack saw blade 116 over the studs 112 and 130, and tightening the shaft 106 by means of the bolt 104 on the threaded end 108 of the shaft 106, the hack saw attachment 10 is secured to the sabre saw 12 by first placing the open returned tabs 50 and 52 over the end 54 of the sabre saw guide plate 22 and securing it in position on the sabre saw guide plate 22 by means of the nut and bolt assemblies 58 extending through the openings 56 in the attaching plate 42 and the sabre saw guide plate 22.

The coupling member 18 is then placed over the reciprocal member 20 of the sabre saw 24 and secured in position by means of the set screws 132 and 134. The other end of the coupling member 18 is secured to the hack saw means 16 by the nut and bolt assembly 140.

The assembled hack saw attachment 10 and sabre saw 12 are then held by means of one hand gripping the handle 72 and the other hand gripping the grip 144 of the sabre saw 24. The sabre saw 24 is then turned on by means of the switch 26 whereby the member 20 of the sabre saw 24 reciprocates to reciprocate the coupling member 18 axially and to thus reciprocate the hack saw means 16 in the attachment guide means 14 to cause the hack saw blade 116 to reciprocate and perform required metal cutting.

While one embodiment of the present invention has been considered in detail, it will be understood that other embodiments and modifications of the invention are contemplated by the inventor. It is the intention to include all such modifications and embodiments as are defined by the appended claims within the scope of the invention.

I claim:

1. A hack saw attachment for a sabre saw whereby a motor driven hack saw is provided, said hack saw attachment comprising attachment guide means including an attaching plate adapted to be secured to the sabre saw, parallel spaced apart hack saw guide members extending substantially perpendicularly to the attaching plate for guiding hack saw means in reciprocating movement with respect to the attachment guide means and diagonal bracing members located between the attaching plate and the hack saw guide members, said sabre saw having a reciprocal member adapted to reciprocate on energizing of the sabre saw, hack saw means positioned in the attachment guide means for reciprocating movement with respect thereto and coupling means for securing the hack saw means to the reciprocal member of the sabre saw for producing reciprocation of the hack saw means in the attachment guide means on energizing of the sabre saw.

2. Structure as set forth in claim 1, and further including a handle secured to the hack saw guide members of the attachment guide means and extending substantially perpendicularly thereto to facilitate handling of the assembled hack saw attachment and sabre saw.

3. Structure as set forth in claim 2, and further including heat insulating material secured to the parallel spaced apart hack saw guide members of the attachment guide means over a substantial portion of the length thereof on the side of the parallel spaced apart hack saw guide members away from the space therebetween.

4. Structure as set forth in claim 2, wherein the hack saw means comprises a generally U-shaped frame having leg portions and a connecting portion, said connecting portion of said hack saw means extending between and guided by the spaced apart hack saw guide members of the attachment guide means and connector means at the ends of the leg portions of the U-shaped frame for securing the opposite ends of a hack saw blade thereto.

5. Structure as set forth in claim 1, and further including heat insulating material secured to the parallel spaced apart hack saw guide members of the attachment guide means over a substantial portion of the length thereof on the side of the parallel spaced apart hack saw guide members away from the space therebetween.

6. Structure as set forth in claim 5, wherein the hack saw means comprises a generally U-shaped frame having leg portions and a connecting portion, said connecting portion of said hack saw means extending between and guided by the spaced apart hack saw guide members of the attachment guide means and connector means at the ends of the leg portions of the U-shaped frame for securing the opposite ends of a hack saw blade thereto.

7. A sabre saw having a housing, a sabre saw guide plate secured to the housing, a reciprocal member, adapted to reciprocate on energizing of the sabre saw, extending out of the housing toward the sabre saw guide plate and motor means within the housing for producing reciprocating movement of the reciprocal member on energizing of the sabre saw and a hack saw attachment secured to the sabre saw whereby the sabre saw may be utilized as a motorized hack saw which hack attachment comprises attachment guide means secured to the sabre saw including an attaching plate adapted to be secured to the sabre saw guide plate, parallel spaced apart hack saw guide members extending substantially perpendicularly to the attaching plate for guiding hack saw means in reciprocating movement with respect to the attachment guide means and diagonal bracing members located between the attaching plate and the hack saw guide members, hack saw means mounted in the attachment guide means for reciprocating movement with respect thereto and coupling means securing the reciprocal member of the sabre saw to the hack saw means.

8. Structure as set forth in claim 7, and further including a handle secured to the hack saw guide members of the attachment guide means and extending substantially perpendicularly thereto to facilitate handling of the hack saw attachment secured to the sabre saw.

9. Structure as set forth in claim 7, and further including heat insulating material secured to the parallel spaced apart hack saw guide members of the attachment guide means over a substantial portion of the length thereof on the side of the parallel spaced apart hack saw guide members away from the space therebetween.

10. Structure as set forth in claim 7, and further including a handle secured to the hack saw guide members of the attachment guide means and extending substantially perpendicularly thereto to facilitate handling of the hack saw attachment secured to the sabre saw heat insulating material secured to the parallel spaced apart hack saw guide members of the attachment guide means over a substantial portion of the length thereof on the side of the parallel spaced apart hack saw guide members away from the space therebetween.

11. Structure as set forth in claim 7, wherein the hack saw means comprises a generally U-shaped frame having leg portions and a connecting portion, said connecting portion of said hack saw means extending between and guided by the spaced apart hack saw guide members of the attachment guide means and connector means at the ends of the leg portions of the U-shaped frame for securing the opposite ends of the hack saw blade thereto.

12. A hack saw attachment for a sabre saw whereby a motor driven hack saw is provided, said hack saw attachment comprising attachment guide means adapted to be secured to a sabre saw having a reciprocal member adapted to reciprocate on energizing of the sabre saw, hack saw means position in the attachment guide means for reciprocating movement with respect thereto comprising a generally U-shaped frame having leg portions and a connecting portion, said connecting portion of said hack saw means extending between and guided by spaced apart hack saw guide members of the attachment guide means and connector means at the ends of the leg portions of the U-shaped frame for securing the opposite ends of a hack saw blade thereto and coupling means for securing the hack saw means to the reciprocal member of the sabre saw for producing reciprocal movement of the hack saw means and the attachment guide means on energizing of the sabre saw.

* * * * *